United States Patent [19]

Wischermann

[11] Patent Number: 5,485,222
[45] Date of Patent: Jan. 16, 1996

[54] METHOD OF DETERMINING THE NOISE COMPONENT IN A VIDEO SIGNAL

[75] Inventor: Gerhard Wischermann, Weiterstadt, Germany

[73] Assignee: U.S. Philips Corporation, New York, N.Y.

[21] Appl. No.: 252,507

[22] Filed: Jun. 1, 1994

[30] Foreign Application Priority Data

Jun. 11, 1993 [DE] Germany .................. 43 19 343.9

[51] Int. Cl.⁶ ............................................. H04N 5/21
[52] U.S. Cl. ................... 348/607; 348/620; 348/622
[58] Field of Search ................................. 348/618, 620, 348/622, 607, 701, 664, 533; H04N 5/21

[56] References Cited

U.S. PATENT DOCUMENTS

| | | | |
|---|---|---|---|
| 4,204,219 | 5/1980 | Uchida | 348/607 |
| 4,953,032 | 8/1990 | Suzaki et al. | 348/607 |
| 4,984,069 | 1/1991 | Yamada et al. | 348/664 |

FOREIGN PATENT DOCUMENTS 3121597  8/1988  Germany .................. H04N 5/21

*Primary Examiner*—James J. Groody
*Assistant Examiner*—Glenton B. Burgess
*Attorney, Agent, or Firm*—Edward W. Goodman

[57] ABSTRACT

A motion signal is formed by subtracting an undelayed and a delayed video signal and by subsequently forming the absolute value. An amplitude maximum of the motion signal is initially determined within a search window and subsequently a minimum corresponding to the noise peak value is determined from the maximum values of a plurality of search windows.

8 Claims, 3 Drawing Sheets

METHOD OF DETERMINING THE NOISE COMPONENT IN A VIDEO SIGNAL

BACKGROUND OF THE INVENTION

1. Field of the Invention

The invention relates to a method of determining a noise component in a signal, and further relates to a circuit arrangement for performing the method.

2. Description of the Related Art

To reduce noise in video signals, circuits are known which are based on the principle of time-recursive filtering. By feedback of an image-delayed output signal to the input of a recursive filter, the noise component is averaged over several image periods and thus reduced.

In this case, a motion detector is customarily provided which controls the value of the feedback video signal in dependence upon motion present in the image. In a known system in accordance with German Patent DE 31 21 597 C2, corresponding to U.S. Pat. No. 4,485,403, a motion signal is gained by subtraction of the undelayed and the delayed video signal. However, similarly as in the input signal, this motion signal is initially beset with noise which detrimentally influences the motion detector. For example, strong noise may be misinterpreted as motion and the recursive filter does not achieve the optimal noise reduction. In order that this is not used for controlling the recursive filter, equally distributed noise is suppressed by means of a threshold circuit and a low-pass filter.

SUMMARY OF THE INVENTION

In contrast, the present invention has for its object to measure the proportional noise amplitude in the motion signal generated by subtraction of the undelayed and the delayed signal so as to adjust the magnitude of the threshold value.

This object is solved by determining an amplitude maximum of the motion signal within a search window and subsequently determining a minimum corresponding to the noise peak value from the maximum values of a plurality of search windows.

The method according to the invention has the advantage that only the noise component of the video signal is detected with few means, which can subsequently be used in a simple manner in television standard conversion etc., in connection with the motion recognition of video signals, for example, during noise reduction.

Advantageous further embodiments and improvements of the method described above are also possible. For example, the advantage of a two-dimensional window is that the low frequency noise components can be even better detected in the measurement.

An advantageous circuit for performing the method according to the invention comprises a device for forming the difference value and the absolute value having inputs for receiving the undelayed and delayed video signal, a maximum peak value measuring circuit having an input connected to the output of the difference/absolute value device and a start input for receiving a start pulse each time at the start of a search window, a first register for storing the maximum values, said first register also receiving the start pulse, a minimum peak value measuring circuit connected to the output of the first register and having a start input for receiving a H-frequency or V-frequency pulse at the end of a blanking interval, and a second register for storing the minimum values, said second register having a clock for receiving the H-frequency or V-frequency pulse.

These and other aspects of the invention will be apparent from and elucidated with reference to the embodiments described hereinafter.

In the drawings

BRIEF DESCRIPTIONS OF THE DRAWINGS

FIG. 3a shows a time diagram of the search window within a line, while

DESCRIPTION OF THE PREFERRED EMBODIMENT

Figure 1:
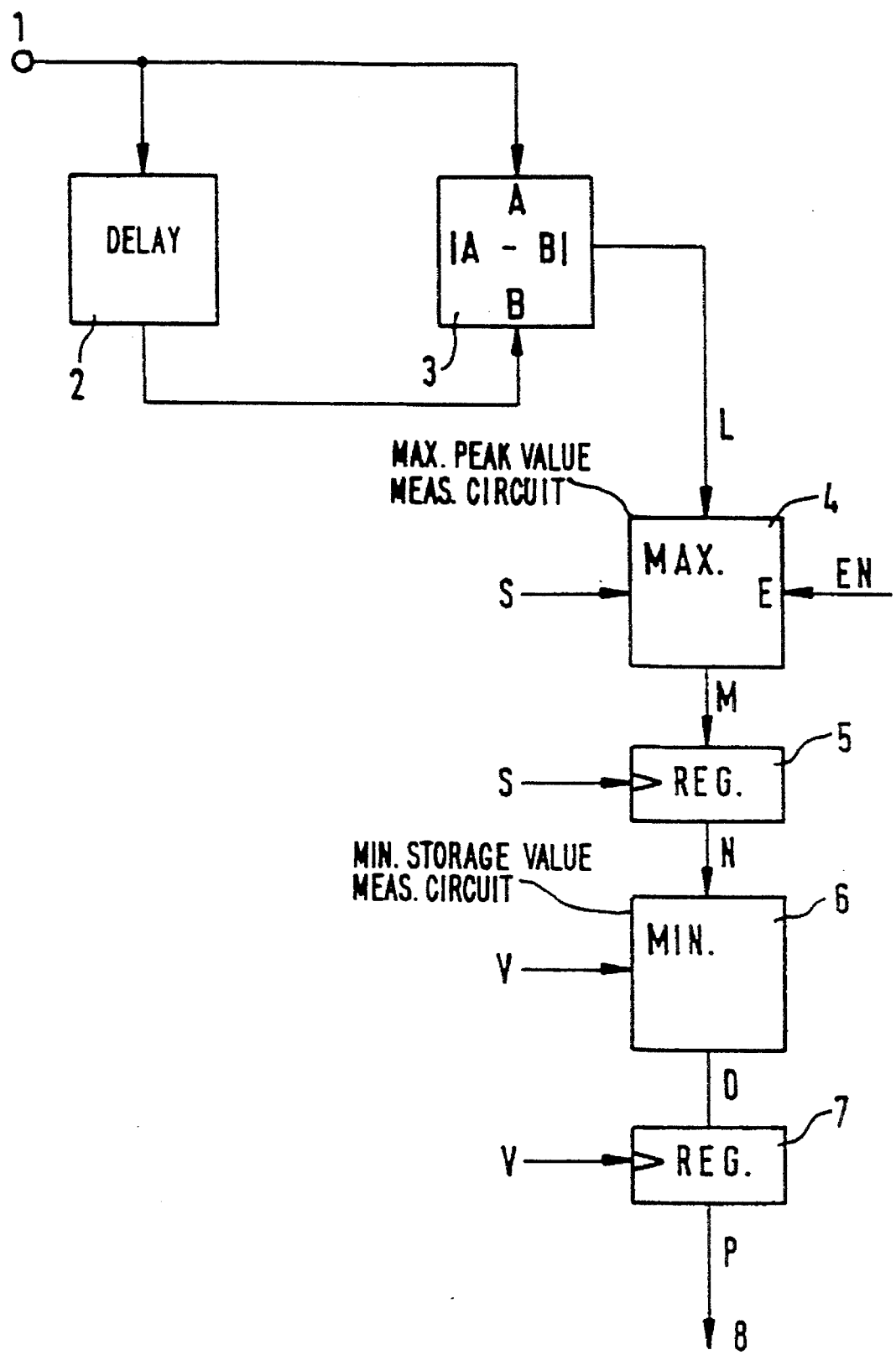
FIG. 1 is a block diagram of a noise detector according to the invention.

In the block diagram of Fig. 1, a video signal beset with noise is present at the terminal 1, which signal is applied directly and via a delay device 2 to the inputs of a device 3 for forming the difference and the absolute value. The delay device 2 delays the video signal by one frame period. Such delay devices are well known and are effectively realized by means of a digital frame memory. In the device 3, the difference between the undelayed and the delayed video signal is formed, from which the absolute value is formed because the influence on noise reduction should be independent of the sign of the variation of the image contents.

Figure 2A:
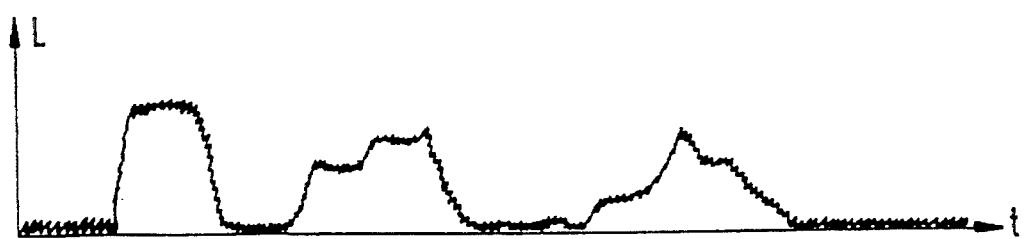
FIG. 2 shows time diagrams of the motion signal of different lines.
Figure 2B:
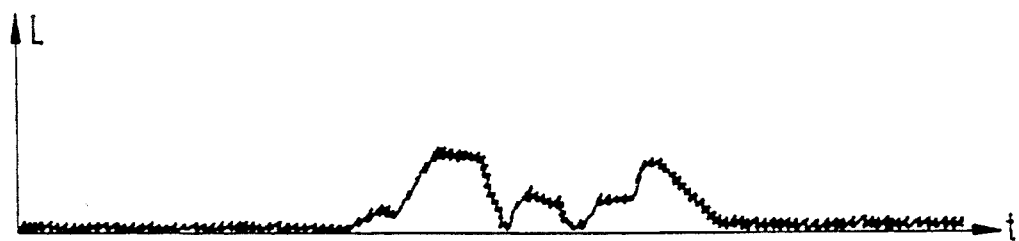
Figure 2C:
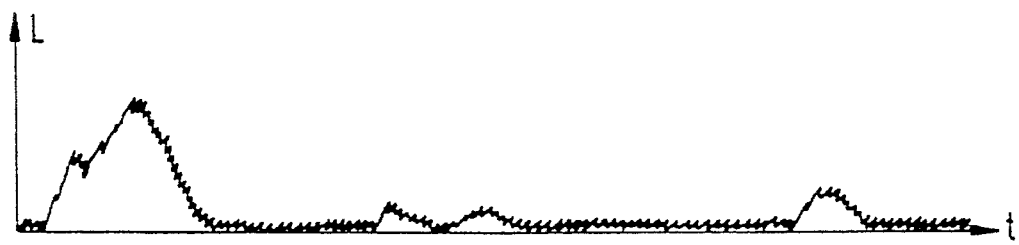

The motion signal L, which can be derived from the output practically comprises only the rectified noise component of the video signal in the case of stationary images, but in images with motion, it consists of the amount of the difference signal values of two consecutive images with superimposed, rectified noise, as is shown, for example in FIG. 2a. The time diagrams of FIG. 2a–2c show the signal amplitudes of a line, the high amplitudes originating from motion and the superimposed small amplitudes originating from noise.

The signal L is applied to a maximum peak value measuring circuit 4 in which the amplitude maximum is fixed within a search window.

In the case of stationary images, the upper envelope curve represents the peak value of the noise component in the input image which can be determined by searching the maximum. The search is initialized with a start pulse S having the initial value M=0. If a larger value (L<M) occurs during a search, it will be detected as a new reference value. At the next staff pulse S, the last M value is taken over in a register 5 and a new maximum search is started simultaneously. At the end of each search section, the signal N supplies the searched peak value of the noise. In the horizontal and vertical blanking intervals of the video signal the maximum search is interrupted by a pulse EN applied to the control input E.

Figure 3A:
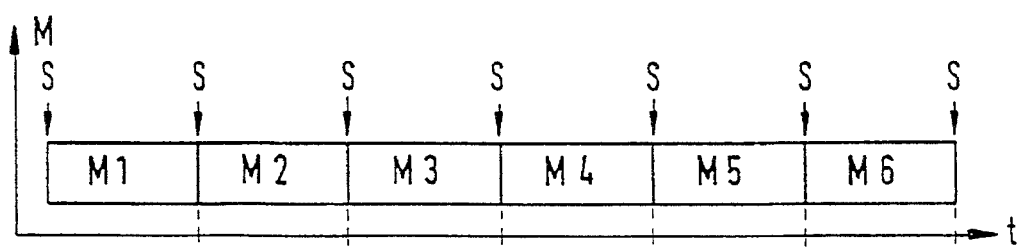
Figure 3B:
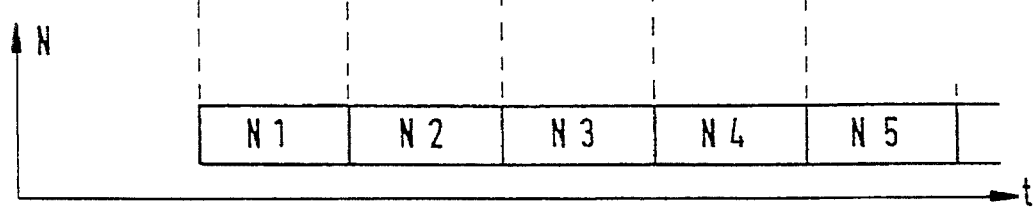
FIG. 3b shows a time diagram of the corresponding sections for transmitting each maximum value.

In FIG. 3a, the search windows M1 to M6 provided, for example during a line are shown as boxes with different M values and a start pulse S is indicated at their start. In FIG. 3b the corresponding intervals of the search windows N1 to N5 are also shown as boxes for the signal N.

In the case of moving image contents, as in FIG. 2a–2e a minimum should be determined of the signal values N over a larger period of time. FIG. 2a show that, also in the case of motion, single lines or also parts of lines remain unchanged, i.e., they have only the noise component. Assuming that the search windows for the search of the amplitude maximum are maintained sufficiently small, at least a value of the signal N which is not influenced by motion will occur with very great probability over a larger period of time (for example, one or more field periods).

The signal N is therefore applied to a minimum storage value measuring circuit 6 which is started with V-frequency pulses so that the measurement of the signal minimum is at least performed in a field period. The minimum signal value O is retained in the subsequent register 7 which is also clocked with V-frequency pulses and at the end of the measuring period, it is supplied as the searched peak value of the noise at the output 8. With this output noise signal P, the video signal present at terminal 1 can then be freed from interference before it is further processed.

Figure 4:
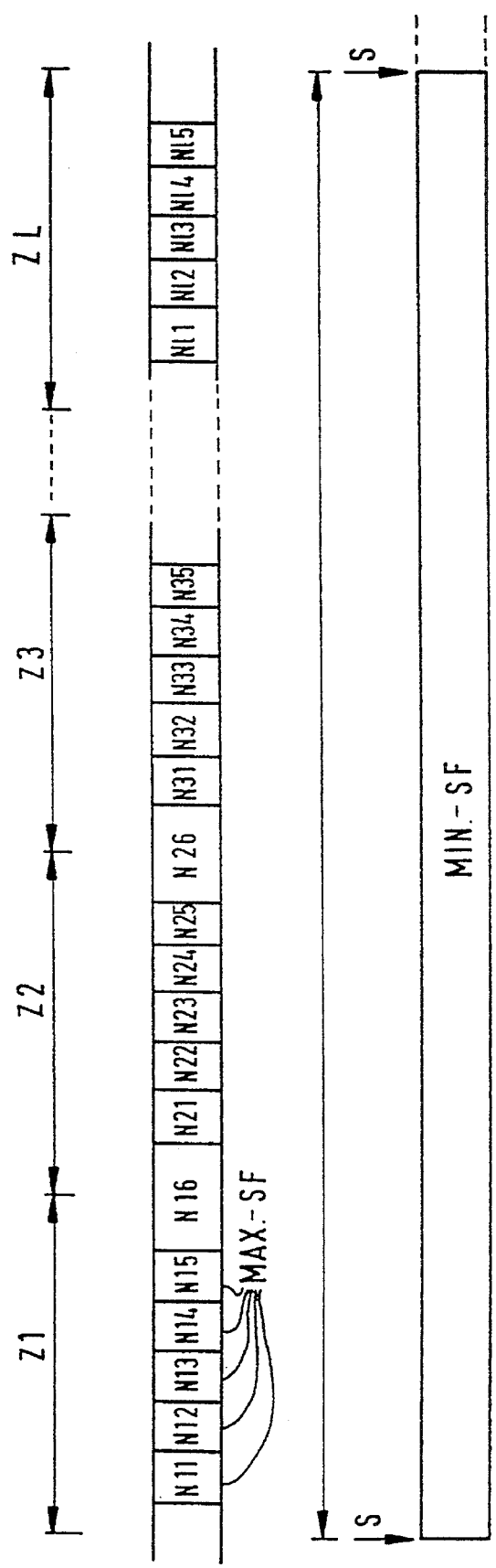
FIG. 4 shows time diagrams of the search windows for determining the maximum and minimum values.

FIG. 4 shows the proportion of the maximum and minimum search windows. In practice, approximately 20 maximum search windows N11, N12, . . . ; N21, N22, . . . ; . . . ; Nl1, Nl2, . . . per line Z1; Z2; . . . ; Z1 have proved to be useful. At a larger number, the sections will become too short to detect the low-frequency noise components. The noise peak value found will then be too small. The length of the minimum search window MIN-SF depends on how fast the measurement is to follow a variation of the noise amplitude. When the minimum search only extends through one frame, large variations of the image contents (for example, scene changes) will have no influence on the measuring results.

A possibility of further improving the method is to perform the maximum search within a two-dimensional window. In this way the low-frequency noise components can even be better detected by the measurement.

I claim:

1. A method of determining a noise component in a video signal comprising the steps:

forming a motion signal (L) by subtracting an undelayed and a delayed video signal and by forming the absolute value of the difference;

establishing a plurality of search windows each having a predetermined time duration;

determining an amplitude maximum value (M) of the motion signal within each of said plurality of search windows; and determining a minimum value, corresponding to a noise peak value, from the amplitude maximum values determined within said plurality of search windows.

2. A method as claimed in claim 1, characterized in that the step of determining the amplitude maximum is interrupted during horizontal and vertical blanking intervals in the video signal.

3. A method as claimed in claim 1, characterized in that the search window is one-dimensional.

4. A method as claimed in claim 3, characterized in that up to 20 search windows per line are provided.

5. A method as claimed in claim 1, characterized in that the search window is two-dimensional.

6. A method as claimed in claim 1, characterized in that the minimum value is determined from the maximum values of a plurality of search windows within at least one field period.

7. A circuit for determining a noise component in a video signal, said circuit comprising means for forming a delayed video signal from an undelayed video signal, characterized in that said circuit further comprises:

a device for forming a difference value of the undelayed and the delayed video signal and for forming an absolute value of the difference value;

a maximum peak value measuring circuit having an input connected to an output of the device for forming the difference value and the absolute value, said maximum peak value measuring circuit having a start input for receiving a start pulse (S) each time at the start of a search window;

a first register connected to an output of said maximum peak value measuring circuit for storing maximum values supplied by the maximum peak value measuring circuit, said first register having a clock input for receiving said start pulse (S);

a minimum peak value measuring circuit having an input connected to an output of the first register, and having a start input for receiving a H-frequency or V-frequency pulse at an end of a blanking interval in said undelayed video signal; and a second register connected to an output of said minimum peak value measuring circuit for storing minimum values supplied by said minimum peak value measuring circuit, said second register having a clock input which also receives the H-frequency or V-frequency pulse and an output for providing the noise component (P) in the video signal.

8. A circuit as claimed in claim 7, characterized in that said maximum peak value measuring circuit further comprises a control input (E) to which a H-frequency or V-frequency pulse is applied at a start of the blanking interval.

* * * * *